Patented Mar. 13, 1934

1,950,468

UNITED STATES PATENT OFFICE 1,950,468

ALKYD RESINOUS COMPOSITION

Frithjof Zwilgmeyer, Hamburg, N. Y., assignor to National Aniline and Chemical Company, Inc., New York, N. Y., a corporation of New York No Drawing. Application April 18, 1930
Serial No. 445,529

22 Claims. (Cl. 260—8)

This invention relates to compositions of the class of resinous condensation products derived from an organic polycarboxylic acid and a polyhydric alcohol, which products have come to be known as "alkyd" resins or resins of the "Glyptal" type.

An object of the present invention is the preparation of new resinous condensation products.

Another object of the present invention is the preparation of resinous condensation products derived from a polyhydric alcohol, an organic polycarboxylic acid, and an ester of an organic polycarboxylic acid which contains a free carboxyl group.

Other objects of the invention will in part be obvious and will in part appear hereinafter.

The invention accordingly comprises the new products as well as the several steps and the relation of one or more of such steps with respect to each of the others thereof employed for the preparation of such products which will be exemplified in the products and process hereinafter disclosed. The scope of the invention will be indicated in the claims.

Resinous materials of widely different properties have heretofore been made by the partial esterification of a polyhydric alcohol with an organic polycarboxylic acid to form an intermediate product containing unesterified hydroxyl groups followed by further condensation of the intermediate product with an organic mono- or polycarboxylic acid. (Cf. U. S. Patents 1,098,776 and 1,098,777).

According to the present invention, synthetic resinous condensation products may be prepared from a partially esterified organic polycarboxylic acid, a polyhydric alcohol, and an organic polycarboxylic acid; more particularly, from a partially esterified organic polycarboxylic acid, containing a free carboxyl group, and a partially esterified polyhydric alcohol, containing an unreacted alcoholic group and obtainable by the interaction of a polyhydric alcohol with an organic polycarboxylic acid. I have found that the alkyd resinous condensation products resulting from the condensation of partially esterified organic polycarboxylic acids and polyhydric alcohols which are partially esterified by organic polycarboxylic acids have advantageous properties; for example, increased elasticity and greater flexibility than the related known products. I have furthermore found that the resinous condensation products resulting from the condensation of partially esterified halogen-substituted organic polycarboxylic acids with polyhydric alcohol—polycarboxylic acid esters containing an unreacted alcoholic group, and especially those esters which also contain halogen, are particularly elastic.

In preparing the resinous condensation products of the present invention in accordance with a preferred method of procedure, a partially esterified polyhydric alcohol may be prepared by the incomplete esterification of a polyhydric alcohol with an organic polycarboxylic acid, more particularly a halogen-substituted organic polycarboxylic acid, in accordance with the known procedure (e. g., U. S. Patent 1,098,776; and the resulting intermediate product may be heated with a partially esterified organic polycarboxylic acid, more particularly a halogen-containing partially esterified organic polycarboxylic acid.

Among the polyhydric alcohols which may be employed in accordance with the present invention, there may be mentioned by way of example, glycerol, the polyglycerols, (e. g., diglycerol, triglycerol, etc., or mixtures of polyglycerols), glycols, (e. g., ethylene glycol, propylene glycol, butylene glycol, etc., or mixtures of glycols), polyglycols, (e. g., diethylene glycol, triethylene glycol, etc., or mixtures of polyglycols) pentaglycol, erythritol, mannitol, glucose, sugar, dextrine, starch, etc. Mixtures of two or more polyhydric alcohols, or of a polyhydric alcohol with a monohydric alcohol may be used.

Among the polycarboxylic acids which may be employed in accordance with the present invention there may be mentioned, by way of example, aliphatic or aromatic polycarboxylic acids; as for example, succinic acid, malic acid, oxalic acid, fumaric acid, maleic acid, malonic acid, sebacic acid, citric acid, tartaric acid, pyro-tartaric acid, malo-malic acid, glutaric acid, phthalic acid, diphenic acid, 1.8-naphthalic acid, halogenated phthalic acids (e. g., tetrachloro-phthalic acid), halogenated succinic acids (e. g., monoic acid), chloro-succinic acid, mono-bromo-succinic acid, dichloro-succinic acid, dibromo-succinic acid, trichloro-succinic acid, tribromo-succinic acid, etc.), halogenated malic acids (e. g., mono-chloro-malic acid, mono-bromo-malic acid, etc.), halogenated maleic acids (e. g., mono-, or di-, chloro-, or bromo-, maleic acids, etc.), halogenated fumaric acids, halogenated sebacic acids, halogenated citric acids, halogenated pyro-tartaric acids, halogenated malo-malic acids, halogenated glutaric acids, halogenated adipic acids, and the like. Mixtures of two or more polycarboxylic acids also may be used.

The partially esterified polycarboxylic acids which may be employed in the preparation of the products of the present invention include the ester-acids which may be represented by the following probable formula

wherein A represents a residue of a polycarboxylic acid, $n$ represents an integer, and R represents an alkyl group, which, when $n$ is greater than 1, may be the same or different alkyl groups. As illustrations of such ester-acids, there may be mentioned: mono-methyl succinate, mono-ethyl succinate, mono-ethyl maleate, mono-ethyl malate, mono-isopropyl maleate, di-isopropyl citrate, diethyl-malo-malate, mono-isopropyl ester of mono-chloro-succinic acid, mono-ethyl phthalate, mono-ethyl tetra-chloro-phthalate, etc. The mono esters of dicarboxylic acids, and more particularly of the halogen-substituted dicarboxylic acids are preferred.

Mixtures of two or more partially esterified organic polycarboxylic acids also may be employed.

The extent to which the reaction mixture may be heated and the temperature employed may be varied widely, depending upon the properties of the products desired to be obtained (e. g., solubility, fusibility, hardness, etc.) as will be evident to a chemist skilled in the making of alkyd resins.

Resinous products of somewhat different constitution but of similarly improved properties also may be prepared in accordance with the present invention by mixing together the polyhydric alcohol with the polycarboxylic acid and the partially esterified acid, for example, in proportions providing a free hydroxyl group for each free carboxyl group present in the acid and partially esterified acid, and heating the mixture.

Resinous products furthermore may be prepared from a partially esterified polyhydric alcohol and a mixture of a partially esterified polycarboxylic acid, as for example, those above mentioned, with another suitable acid or derivative, as for example an aliphatic mono- or poly-carboxylic acid (e. g., malic acid, succinic acid, fumaric acid, maleic acid, oxalic acid, malonic acid, sebacic acid, citric acid, tartaric acid, pyrotartaric acid, malo-malic acid, glutaric acid, adipic acid, butyric acid, propionic acid, stearic acid, palmitic acid, lactic acid, glycolic acid, acrylic acid, crotonic acid, chlor-acetic acid, chlor-propionic acid, a halogenated polycarboxylic acid— e. g. those above mentioned), an aromatic carboxylic acid, (e. g., benzoic acid, phthalic acid, cinnamic acid, salicylic acid, chlorbenzoic acid, diphenic acid, 1.8-naphthalic acid, benzoyl-benzoic acid, etc.), a natural resin or resin acid (e. g., colophony, copal, Congo, abietic acid, etc.), or an unsaturated vegetable or animal oil, or acid thereof (e. g., linseed oil, China-wood oil, fish oil, soya bean oil, castor oil, linoleic acid, linolenic acid, oleic acid, oleostearic acid, mixed fatty acids of the drying oils, etc.).

As illustrative embodiments of a manner in which the invention may be practiced the following examples are presented.

*Example 1.*—A mixture of 183 parts of glycerol with about 355 parts of mono-bromo-maleic anhydride

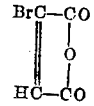

is slowly heated with stirring. As the heating progresses, the mixture at first becomes homogeneous and then gradually increases in viscosity, while gentle distillation takes place. Upon completion of this stage of heating, as indicated by a decrease in the evolution of gas, there is added to the mixture 430 parts of mono-isopropyl ester of monochloro-succinic acid (having the probable formula

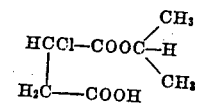

and obtainable, for example, by heating together maleic anhydride, isopropyl alcohol and hydrogen chloride, and separating the mono-ester from the di-ester by means of caustic alkali in the known manner). The resulting mixture is further heated at about 180° to 290° C. until a sample on cooling forms a solid mass soluble in acetone. The resulting product is a resinous material of very high elasticity. It may be mixed with a suitable filler and employed as a plastic composition or cement, or it may be dissolved in a suitable solvent and employed as a varnish, as an impregnating solution for fabrics or electrical apparatus; or it may be incorporated into nitro-cellulose lacquers, etc. By gently heating it for a considerable period of time, the product may be converted into a less fusible, less soluble resinous product, still possessing, however, high elasticity.

*Example 2.*—A mixture of about 92 parts of glycerol and 98 parts of maleic anhydride is heated with stirring to form an intermediate resinous product, in a manner similar to that described in Example 1. There is then added about 130 parts of mono-ethyl succinate, and the heating is continued further at a moderate temperature until a sample upon cooling forms a resinous product soluble in acetone. This product, which is highly elastic, may be further heated to form a harder, less fusible and less soluble, tough, elastic resin.

It will be realized that the process is not limited to the above specific examples but may be varied within wide limits without departing from the spirit and scope of the invention.

Thus, in carrying out the condensation the reaction may be caused to take place in a suitable solvent or diluent, such as, alcohol, diethyl phthalate, benzyl benzoate, and the like.

The temperatures at which the condensations are caused to occur may vary. Temperatures up to about 200° C. may be preferably employed in the first stage of the reaction, and higher or lower temperatures may be employed in the final stages of heating. Lower temperatures are preferred to higher temperatures although they require a longer period of heating for the production of a product of the same stage of condensation than do the higher temperatures, in view of the greater ease of control of the reaction at the lower temperatures.

If desired, the final reaction may be accelerated by carrying out the condensation in the presence of a suitable catalyst, such as, a suitable metal oxide, e. g., zinc, magnesium, or calcium oxide, or a finely divided metal, e. g. zinc or iron; a suitable liquid catalyst, e. g., furfural or its derivatives and equivalents (methyl furfural, phenyl-methyl furfural, furfur-acetone, etc.); or a small amount of a phenol-formaldehyde condensation product.

The proportions in which the reacting materials are employed may be varied within wide limits. In the preparation of the intermediate condensation product, the polyhydric alcohol preferably may be employed in an amount relative to the carboxylic acid to provide a product which contains an unreacted alcoholic group. The amount of ester-acid employed to complete the esterification may be varied, depending upon the properties desired of the final product; the greater the proportion of ester-acid employed relative to the intermediate condensation product, the more flexible and fusible will be the resulting final product.

The preparation of resinous products of the present invention is not limited to the methods of procedure hereinbefore described, but other suitable methods of preparation may be employed.

The various resins included within the scope of the invention are not limited to the uses above indicated but may be applied for various purposes, the uses of the individual resins being dependent upon the particular properties of said individual resins, as will be evident to those familiar with the subject. Thus, a resin of a suitable fusibility and solubility may be employed either as such or in solution for the preparation of varnishes; baking enamels; paints; lacquers; adhesives; cements; impregnating, indurating, and the like compositions; molding and related plastic compositions; celluloid substitutes; stencil-paper; insulating compositions; phonograph and similar records; films; threads; enameled wire and metal plate; floor and roof coverings; abrasive manufactures; laminated fabric boards; and the like.

The resins also may be employed, where desirable in compositions including other materials, as for example, other resins (such as, artificial resins; e. g., the phenol-formaldehyde resins, other alkyd resins, phenol-furfural resins, furfural-aniline resins, aldehyde-ketone resins, aldehyde-amine resins, sulfur resins, etc.; the natural resins, e. g., colophony, shellac, copal, dammar, Kauri, Congo, etc.; resinous substances of the rubber type, e. g., rubber, gutta-percha, ballata, etc.; and the like); cellulose compounds (such as, nitrocellulose, cellulose ethers, and cellulose esters); plasticizing, flexibilizing, and similar compounds (such as, camphor, castor-oil, glycerine, naphthalene, anthracene, chlor-naphthalenes, aryl-phosphates, alkyl and arylphthalates, benzyl-benzoate, acetanilide, etc.); diluting and cheapening compositions (such as, pitch, asphalt, stearine pitch, gilsonite, etc.); fillers and other inert solid materials (such as, asbestos, sand, clay, talc, mica, hardened resins, wood flour, rotten stone, cotton, etc.); suitable solvents; or mixtures of the above or similar compositions.

In preparing mixed compositions of the resins of the present invention and other artificial resins (as for example, those above mentioned) the resins may be mixed in the intermediate stages of their formation and the mixture may be heated to produce a complex resinous composition; thus, a fusible and soluble resin of the present invention may be mixed with a stage-A phenol-formaldehyde resin, and the mixture may be heated to effect further condensation.

Inasmuch as in the preparation of the resinous products of the invention the anhydrides of the acids above mentioned may be employed alternatively or in admixture with the organic acids, it will be understood that where above or in the claims the acid is referred to, both the acid and the anhydride are intended to be included.

Since, in carrying out the above process, changes may be made without departing from the scope of the invention, it is intended that all matter contained in the above description shall be interpreted as illustrative and not in a limiting sense, except as limited by the claims.

I claim:

1. A resinous condensation product derived from a polyhydric alcohol, an organic polycarboxylic acid, and a partially esterified organic polycarboxylic acid.

2. A resinous condensation product derived from a polyhydric alcohol, an organic polycarboxylic acid, and a partially esterified halogen-substituted organic polycarboxylic acid.

3. A resinous condensation product derived from the reaction of a polyhydric alcohol with a halogen-substituted organic polycarboxylic acid in an amount insufficient completely to esterify all of said polyhydric alcohol, and with a partially esterified organic polycarboxylic acid.

4. A resinous condensation product derived from the reaction of a polyhydric alcohol with a halogen-substituted organic polycarboxylic acid in an amount insufficient completely to esterify all of said polyhydric alcohol, and with a partially esterified halogen-substituted aliphatic dicarboxylic acid.

5. A resinous condensation product derived from the reaction of glycerol with a halogen-substituted organic polycarboxylic acid in an amount insufficient completely to esterify all of said glycerol, and with a partially esterified chloro-succinic acid.

6. A resinous condensation product derived from a partially esterified organic polycarboxylic acid and a polyhydric alcohol which is partially esterified by an organic polycarboxylic acid.

7. A resinous condensation product derived from a polycarboxylic acid partially esterified by an alcohol, and a polyhydric alcohol partially esterified by a polycarboxylic acid different from the first mentioned acid.

8. A resinous condensation product derived from a polyhydric alcohol partially esterified by a polycarboxylic acid, and a polycarboxylic acid partially esterified by a polyhydric alcohol different from the first mentioned alcohol.

9. A resinous condensation product derived from a partially esterified organic polycarboxylic acid and a polyhydric alcohol which is partially esterified by a halogen-substituted organic polycarboxylic acid.

10. A resinous condensation product derived from a partially esterified halogen-substituted aliphatic dicarboxylic acid and a polyhydric alcohol which is partially esterified by a halogen-substituted organic polycarboxylic acid.

11. A resinous condensation product derived from a partially esterified organic polycarboxylic acid and an organic polycarboxylic acid ester of glycerol, which ester contains a free alcoholic group.

12. A resinous condensation product derived from a partially esterified halogen-substituted organic polycarboxylic acid and a glycerol ester of a halogen-substituted aliphatic carboxylic acid, which ester contains a free alcoholic group.

13. A resinous condensation product derived from a partially esterified organic polycarboxylic acid and a mono-chloro-maleic acid ester of glycerol, which ester contains a free alcoholic group.

14. A resinous condensation product derived from mono-isopropyl ester of mono-chloro-succinic acid and a mono-chloro-maleic acid ester of glycerol, which ester contains a free alcoholic group.

15. A process of producing resinous condensation products which comprises heating a polyhydric alcohol with an organic polycarboxylic acid and with a partially esterified aliphatic polycarboxylic acid.

16. A process of producing resinous condensation products which comprises heating a polyhydric alcohol with an organic polycarboxylic acid in an amount insufficient completely to esterify all of said polyhydric alcohol and with a partially esterified halogen-substituted organic polycarboxylic acid.

17. A process of producing resinous condensation products which comprises heating a polyhydric alcohol with an organic polycarboxylic acid in an amount insufficient completely to esterify all of said polyhydric alcohol and with mono-isopropyl ester of mono-chloro-succinic acid.

18. A process of producing resinous condensation products which comprises heating a polyhydric alcohol with a halogen-substituted aliphatic polycarboxylic acid in an amount insufficient completely to esterify all of said polyhydric alcohol and with a partially esterified aliphatic polycarboxylic acid.

19. A process of producing resinous condensation products which comprises heating a polyhydric alcohol with a halogen-substituted aliphatic polycarboxylic acid in an amount insufficient completely to esterify all of said polyhydric alcohol and with a partially esterified halogen-substituted organic polycarboxylic acid.

20. A process of producing resinous condensation products which comprises heating a polyhydric alcohol with an organic polycarboxylic acid in an amount insufficient completely to esterify all of said polyhydric alcohol and heating the resulting partially esterified polyhydric alcohol with a partially esterified aliphatic polycarboxylic acid.

21. A process of producing resinous condensation products which comprises heating glycerol with a halogen-substituted aliphatic polycarboxylic acid in an amount insufficient completely to esterify all of said glycerol and heating the resulting partially esterified glycerol with a partially esterified halogen-substituted organic polycarboxylic acid.

22. A process of producing resinous condensation products which comprises heating glycerol with mono-chloro-maleic acid in an amount insufficient completely to esterify all of said glycerol and heating the resulting partially esterified glycerol with mono-isopropyl ester of mono-chloro-succinic acid.

FRITHJOF ZWILGMEYER.